(12) United States Patent
Hamidieh et al.

(10) Patent No.: US 7,140,252 B2
(45) Date of Patent: Nov. 28, 2006

(54) STRUCTURALLY TUNED VIBRATION BASED COMPONENT CHECKING SYSTEM AND METHOD

(75) Inventors: Youssef Hamidieh, Bloomfield, MI (US); Philip Barlas, N. Canton, MI (US); James Pospisil, Alexandria, MN (US); Prashanth Magadi, Canton, MI (US); Chandra Jalluri, Canton, MI (US)

(73) Assignees: Ford Motor Company, Dearborn, MI (US); Illinois Tool Works, Inc., Glenview, IL (US)

(*) Notice: Subject to any disclaimer, the term of this patent is extended or adjusted under 35 U.S.C. 154(b) by 142 days.

(21) Appl. No.: 10/709,420

(22) Filed: May 4, 2004

(65) Prior Publication Data

US 2005/0247132 A1 Nov. 10, 2005

(51) Int. Cl.
G01M 13/02 (2006.01)
(52) U.S. Cl. .......................................... 73/593; 73/162
(58) Field of Classification Search ................ 73/593, 73/162, 579, 660
See application file for complete search history.

(56) References Cited

U.S. PATENT DOCUMENTS

| | | | |
|---|---|---|---|
| 3,031,765 A | 5/1962 | Muller | |
| 3,336,789 A | 8/1967 | Mayer | |
| 4,252,023 A * | 2/1981 | Pomernacki | 73/593 |
| 4,488,359 A | 12/1984 | Misson | |
| 4,550,604 A | 11/1985 | Sugimoto et al. | |
| 4,704,799 A | 11/1987 | Kobetsky | |
| 4,831,872 A | 5/1989 | Huang et al. | |
| 4,872,337 A | 10/1989 | Watts et al. | |
| 4,931,949 A * | 6/1990 | Hernandez et al. | 73/593 |
| 5,574,646 A | 11/1996 | Kawasaki et al. | |
| 5,596,496 A | 1/1997 | Loeffler | |
| 5,728,938 A * | 3/1998 | Choi et al. | 73/593 |
| 5,893,892 A | 4/1999 | Loeffler | |
| 6,389,888 B1 | 5/2002 | Juranitch et al. | |
| 6,393,902 B1 | 5/2002 | Juranitch | |
| 6,507,789 B1 | 1/2003 | Reddy et al. | |
| 6,526,816 B1 | 3/2003 | Genise et al. | |
| 6,662,669 B1 | 12/2003 | Juranitch et al. | |

* cited by examiner

*Primary Examiner*—John E. Chapman
(74) *Attorney, Agent, or Firm*—Brooks Kushman P.C.

(57) ABSTRACT

A structurally tuned, vibration-based component checking system for detecting anomalies in a component of an assembly prior to the component being installed in the assembly is provided. The component checking system operates the component being tested at a speed that is different from the speed at which the component operates during normal use in the assembly, and also under a different load. To compensate for this difference in speed and load, the component checking system is structurally tuned such that a relationship exists between the modal frequencies and speed of operation of the component checking system and the modal frequencies and speed of operation of the assembly.

17 Claims, 6 Drawing Sheets

STRUCTURALLY TUNED VIBRATION BASED COMPONENT CHECKING SYSTEM AND METHOD

BACKGROUND OF INVENTION

1. Field of the Invention

The present invention relates to a structurally tuned, vibration based component checking system and method for detecting component anomalies in an assembly prior, to the component being installed in the assembly.

2. Background Art

With ever increasing emphasis on quiet vehicle rides, the noise, vibration and harshness (NVH) levels in vehicle powertrains have assumed a significant role in defining the overall noise levels in a vehicle. For example, gear noise can be a major contributor to unacceptable transmission NVH levels which, in turn, contributes to unacceptable NVH levels in vehicles. To deal with these issues, a variety of gear measurement and checking systems have been developed to identify and eliminate noisy gears before they are assembled in transmissions and installed in a vehicle.

Current practice also includes placing test stands in transmission manufacturing plants to check NVH levels after the transmissions are assembled. Computer aided simulations of transmissions, and even complete vehicle dynamics, are also used. This is complemented by vehicle road tests for a certain number of transmissions manufactured and assembled.

Although these testing procedures after transmission assembly may reduce the number of noisy transmissions installed in vehicles, detecting unacceptable NVH levels at an end-of-line test stand, or by road tests, is costly and wasteful. Therefore, different gauging/checking strategies are available for detection of gear defects before assembly at machining departments. The current gauges in place in machining areas have limited detection capabilities; and often do not detect subtle gear anomalies which can lead to unacceptable NVH levels in a vehicle.

The gear gauging systems currently available in machining departments measure dimensional features of the gears and the tooth surface profiles. They are, however, not capable of performing functionality based NVH checking of the gears before they are used in a transmission assembly. Furthermore, there are a few other types of gauging systems in place, including Transmission Error (TE) testers and testers which measure vibration characteristics. These also have limited capabilities.

One limitation in these systems is that the dynamic response of their structures do not correlate in any way with the structural response of the fully assembled transmission systems. Therefore, they fail to detect the micron level subtle anomalies which would produce noise in the assembled transmission. In such a system, the structural components may be generally very stiff, resulting in low excitation levels in response to gear defects. Thus, by attempting to reduce the vibration of the gear checking structure, the checking structure no longer resembles the finished assembly, and the test results may not be indicative of how the tested component will perform when it is installed.

Therefore, a need exists for a component checking system and method capable of detecting subtle anomalies in a component of an assembly, prior to the component being installed in the assembly.

SUMMARY OF INVENTION

Accordingly, the present invention provides a component checking system and method capable of detecting subtle anomalies in a component of an assembly, prior to the component being installed in the assembly.

The invention further provides a method for detecting anomalies in a component of an assembly prior to the component being installed in the assembly. The component is movable at one or more speeds in the assembly. The method includes configuring a component checking system to operate the component at one or more predetermined speeds. The checking system includes at least one checking system sensor. A speed of operation for the component in the checking system is determined, chosen from the one or more predetermined speeds. At least one anomaly frequency of the component in the checking system is determined; it is a function of the speed of operation of the component in the checking system. At least a portion of the checking system is configured to have at least one modal frequency within a predetermined frequency range of the checking system. The predetermined frequency range of the checking system includes the at least one anomaly frequency of the component in the checking system. At least a portion of the checking system is configured to have modal characteristic such that discrimination for the component in the checking system is within a predetermined range based on a discrimination for the component in the assembly. The discrimination for the component in the checking system is defined as a difference between an amplitude response of the checking system using a component having at least one anomaly and an amplitude response of the checking system using a component having substantially no anomalies. The modal characteristics and the amplitude responses of the checking system are determined using the at least one checking system sensor. The component is operated in the checking system, and values of a response parameter of the checking system are measured while the component is being operated in the checking system. This facilitates detection of anomalies in the component.

The invention further provides a method for detecting anomalies in a selected gear for a vehicle transmission prior to the selected gear being installed in the transmission. The method includes determining at least one modal frequency of the transmission using at least one sensor on a housing of the transmission. A transmission gear mesh frequency is determined as a function of the number of teeth on the selected gear and a speed of rotation of the selected gear in the transmission. It is determined whether the transmission gear mesh frequency is within a predetermined transmission frequency range. The predetermined transmission frequency range includes the at least one modal frequency of the transmission. A location of the transmission gear mesh frequency with respect to the at least one modal frequency of the transmission is also determined. It is further determined whether at least one harmonic frequency of the transmission gear mesh frequency is within the predetermined transmission frequency range. A location of the at least one harmonic frequency of the transmission gear mesh frequency is determined with respect to the at least one modal frequency of the transmission. The at least one sensor on the transmission housing is used to determine a first amplitude response of the transmission, with the transmission including a gear having at least one anomaly. The at least one sensor on the transmission housing is used to determine a second amplitude response of the transmission, with the transmission including a gear having substantially no anomalies. A discrimination for the selected gear in the transmission is determined; the discrimination is defined as a difference between the first and second amplitude responses. A gear checking system is configured, and includes at least one checking system sensor. The checking system is capable of rotating the selected gear at one or more predetermined speeds. A speed of rotation for the selected gear in the checking system is determined, chosen from the one or more predetermined speeds. The speed of rotation of the selected gear in the checking system is different from the speed used to determine the transmission gear mesh frequency. A checking system gear mesh frequency is determined as a function of the number of teeth on the selected gear and the speed of rotation of the selected gear in the checking system. At least one harmonic frequency of the checking system gear mesh frequency is determined. At least a portion of the checking system is configured to have at least one modal frequency within a predetermined frequency range of the checking system. The predetermined frequency range of the checking system includes the checking system gear mesh frequency and the at least one harmonic frequency of the checking system gear mesh frequency. At least a portion of the checking system is configured to have modal characteristics such that discrimination for the selected gear in the checking system is within a predetermined range based on the discrimination for the component in the transmission. The discrimination for the selected gear in the checking system is defined as a difference between an amplitude response of the checking system using a gear having at least one anomaly and an amplitude response of the checking system using a gear having substantially no anomalies. The modal characteristics and the amplitude responses of the checking system are determined using the at least one checking system sensor. The selected gear in the checking system is rotated, and values of a response parameter of the checking system are measured while the selected gear is being rotated in the checking system. This facilitates detection of anomalies in the selected gear.

The invention also provides a structurally tuned vibration based checking system for detecting anomalies in a movable component of an assembly prior to the component being installed in the assembly. The assembly has modal frequencies, and the component has at least one assembly anomaly frequency that is a function of a speed of operation of the component in the assembly at which anomalies in the component are detectable. The at least one assembly anomaly frequency is within a predetermined frequency range of the assembly. The checking system includes a first actuator, operable to operate the component at one or more predetermined speeds. The component has at least one checking system anomaly frequency that is a function of the speed of operation of the component in the checking system. The at least one checking system anomaly frequency is different from the at least one assembly anomaly frequency. A structure supports the component while the component is being operated by the first actuator. The structure is configured such that at least a portion of the checking system has at least one modal frequency within a predetermined frequency range of the checking system. The predetermined frequency range of the checking system includes the at least one checking system anomaly frequency. A sensor measures values of a response parameter of the checking system while the first actuator operates the component.

DETAILED DESCRIPTION

Figure 1:
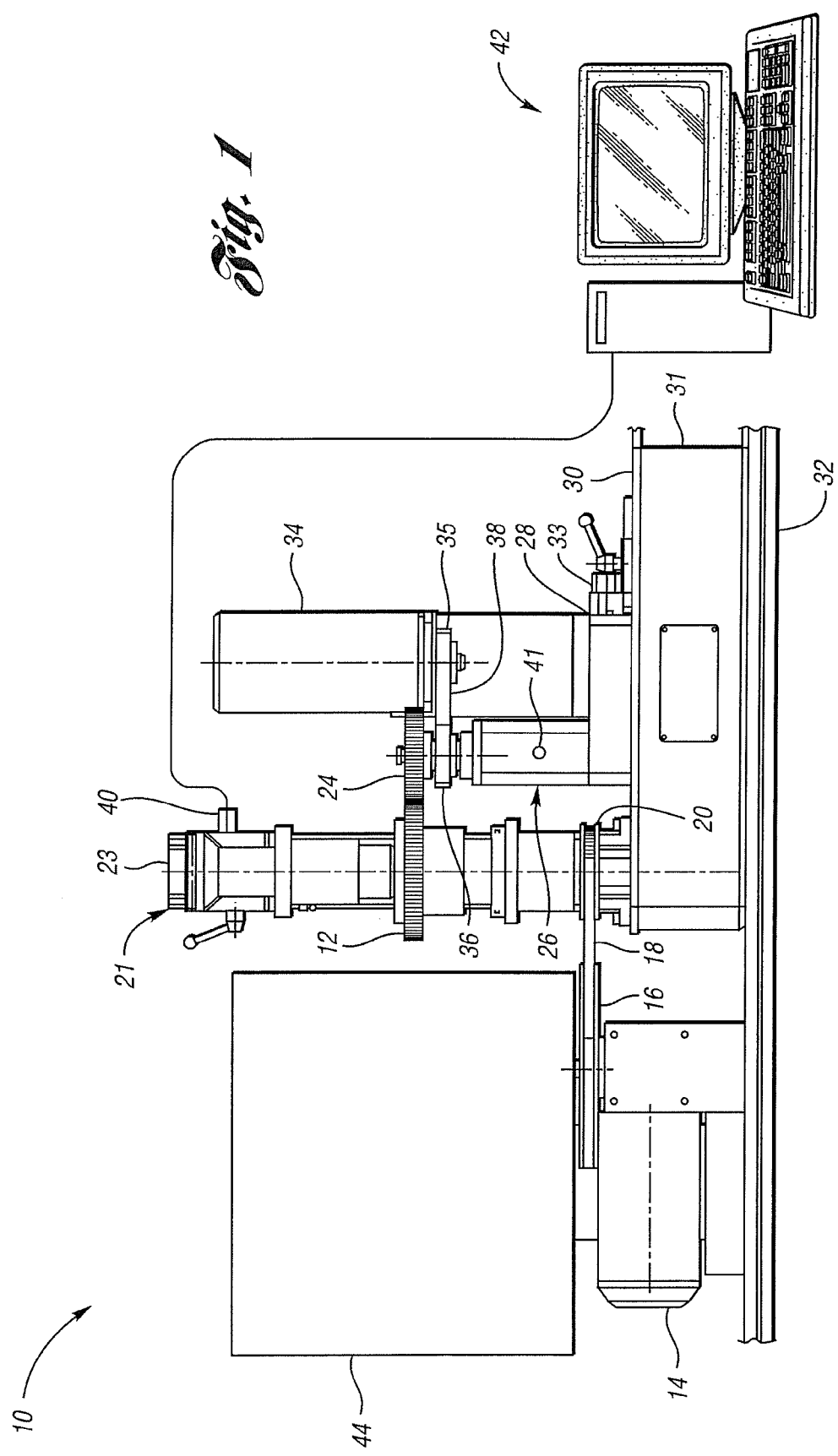
FIG. 1 is a plan view of a component checking system in accordance with the present invention.

FIG. 1 shows a component checking system, and in particular a gear checking system 10, in accordance with the present invention. As explained more fully below, the checking system 10 is a structurally tuned, vibration based checking system for detecting anomalies in a selected component, in this embodiment a gear 12, prior to the gear 12 being installed in an assembly, such as a vehicle transmission. The checking system 10 includes a first actuator, in this embodiment an electric motor 14, which is operable to rotate the gear 12 at one or more predetermined speeds. The motor 14 rotates a pulley 16, and in turn a belt 18, which transmits the rotational motion of the pulley 16 to a second pulley 20.

The checking system 10 also includes a structure in the form of a column 21, including a spindle 22 with rotating components and an expandable collet for supporting the gear 12. Specifically, the gear 12 is supported along its axis of rotation by the spindle 22 and an over-arm 23. The pulley 20 rotates a portion of the spindle 22, thereby rotating the gear 12.

A second component, or master gear 24, is configured to mate with the gear 12, and is driven by the gear 12 as it is rotated by the motor 14. The master gear 24 is mounted on a second spindle 26. The spindle 26 is mounted on a guide 28, which itself is mounted on precision guide ways 30, only one of which is visible in FIG. 1. The guide 28, the guide ways 30, and the spindles 22, 26 all reside on a base 31. The checking system 10 rests on a rubber isolation pad 32 to remove the vibrations transmitted from other sources.

By moving the guide 28 on the guide ways 30, it is possible to vary the amount and type of contact between the gear 12 and the master gear 24. For example, if the guide 28 is moved far enough toward the spindle 22, the gear 12 and master gear 24 will engage in a double flank contact—i.e., a tooth on one gear will simultaneously contact adjacent teeth on the other gear. Thus, a tooth on one gear will have both flanks simultaneously contacting teeth from the other gear. Moving the guide 28 away from the spindle 22 allows the gears 12, 24 to engage in single flank contact. Moreover, adjusting the guide 28 closer to, or farther away from, the spindle 22 provides a means for setting the backlash—i.e., the spacing—between the two gears 12, 24.

As explained more fully below, it may be desirable to provide a particular backlash when checking the gear 12. An adjustable stop 33 controls the engagement of the master gear 24 with the gear 12 being inspected at a preset amount of spacing or backlash. In the engaged position, the guide 28 is locked into position so that the backlash is kept constant for the complete duration of running the test.

In order to provide a torque load to the gear 12 as the motor 14 operates the gear 12, a second actuator, or dc servo motor 34 is provided. Of course, other types of actuators may be used, for example, a magnetic particle brake, a hydraulic motor, or any dynamic braking mechanism. The motor 34 delivers dynamic torque load to a drive sprocket 35, which in turn, applies a torque to a second driven sprocket 36 through a belt 38. The pulley 36 is attached to the spindle 26 below the master gear 24, and thereby imparts a torque load to the master gear 24. Thus, the master gear 24 cooperates with the gear 12 and the motor 34, such that the motor 34 applies appropriate torque load to the gear 12 through the master gear 24 in single flank engagement. This can help to simulate actual operating conditions, such as when the gear 12 is operating under torque load with single flank engagement in a transmission.

As the gear 12, which is being rotated by the motor 14 drives the master gear 24 under torque load for a specific period of time, vibration sensor 40, located on the over-arm 21, and vibration sensor 41, located on the master gear spindle 26 housing, measure values of response parameters, such as acceleration, and output this information to an output device, such as a computer 42. Although the sensors 40, 41 are, in this embodiment, accelerometers, other types of sensors may also be used. For example, acoustic sensors and microphones may be used to measure sound, and output those measurements to a computer, such as the computer 42. Similarly, velocity or displacement sensors may also be used. Sensors, such as the sensors 40, 41, must have sufficient bandwidth to measure parameters over a desired frequency range of interest. The checking system 10 also includes a touch screen 44 which allows an operator to control the various components of the checking system 10, and to input data or other response parameters in both manual and automatic mode. Other types of operator interfaces can also be utilized.

As noted above, the checking system 10 is structurally tuned, and is configured to detect anomalies in a component, such as the gear 12. By "structurally tuned" it is meant that the checking system 10 is specifically configured with at least one modal frequency that falls within a predetermined frequency range. As discussed below, the predetermined frequency range of the checking system 10, may be determined by using the selected speed of rotation for gear under test, and anomaly frequencies for that gear.

The chosen modal frequencies for the checking system 10 will usually not be the same as the modal frequencies of the transmission or other assembly into which the gear 12, or other tested component, will be installed. This is because the gear 12 will be operated at a much lower speed in the checking system 10 than the speed at which it will operate in a transmission. This is required in order not to damage the gear under test in the gear checking system 10, which unlike the actual transmission assembly, operates the gear under dry conditions.

The checking system 10 is configured to detect anomalies in the gear 12. For example, nicks, grinding marks and "plus-tip" conditions are all anomalies that can occur in a gear, such as the gear 12. Often times, anomalies such as these will not be detected using traditional gauging systems or vibration based testing systems, prior to the gear being installed and run in the transmission. When these types of anomalies are not detected before the transmission is installed in a vehicle, they can create undesirable noise and vibration when the vehicle is being driven. Moreover, when the gear anomalies are detected after assembly and in an assembled transmission at the end of a line test stand there is significant cost penalty due to wasted labor, and a substantial number of components may be scrapped.

Figure 2:
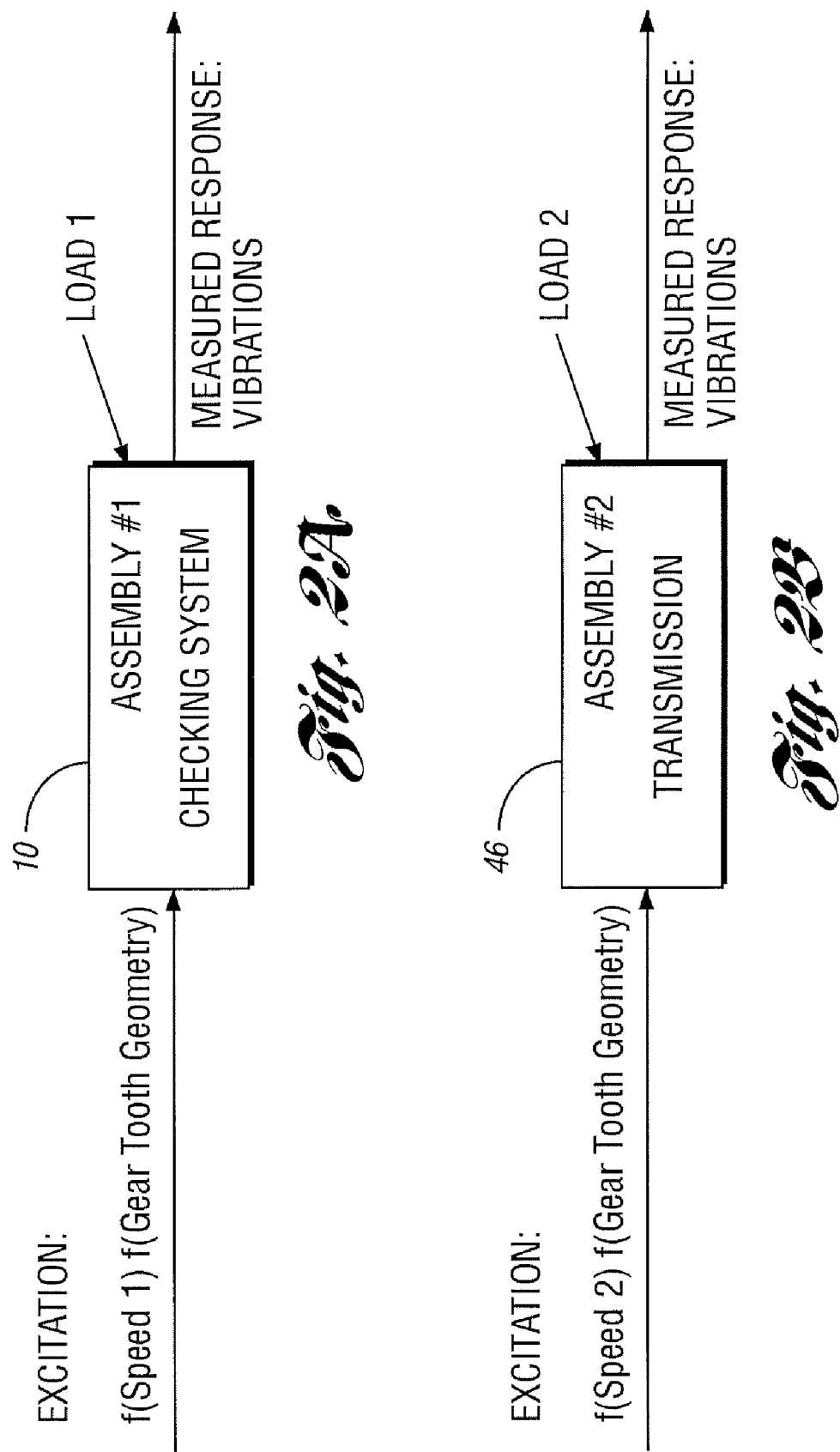
FIGS. 2A and 2B are schematic representations comparing operation of a transmission and the checking system shown in FIG. 1, with respect to structural excitations due to component anomalies.

In order to detect these types of anomalies, and other gear anomalies which may cause undesirable NVH characteristics in a vehicle, the checking system 10 is structurally tuned based on anomaly detection capability which correlates to that of assembled transmission at the end of line test stand. This general concept is schematically illustrated in FIGS. 2A and 2B. In FIG. 2B it is shown that an excitation force caused by a gear, such as the gear 12, within an assembly, such as a transmission 46, is a function of the gear speed (Speed 2) and gear tooth geometry. The transmission 46 operates under a torque load (Load 2), and experiences structural excitation due to gear tooth geometry and gear anomalies.

A response of the transmission is then measured, and in particular, the vibrations of the transmission are measured. FIG. 2A shows that a checking system such as the testing system 10, can be configured to react structurally to gear tooth anomalies in a manner that correlates to that of the transmission 46. In the checking system 10, the excitation force is a function of a gear speed (Speed 1) and gear tooth geometry. A torque load can be applied to the gear checking system (Load 1) and a vibration response of the checking system 10 is measured.

As shown in FIGS. 2A and 2B, the speed of rotation of the gear being analyzed is not the same in the checking system 10 (Speed 1) as it is in the assembled transmission (Speed 2). Also, the applied torque loads are not the same in the two cases. The gear tooth geometry, however, is the same. Thus, the checking system 10 is not configured to have the same modal frequencies and response characteristics as that of the assembled transmission 46. Rather, it is configured to have modal frequencies and response characteristics that will provide a vibration response that is similar to the vibration response in the transmission 46, taking into account the difference in the speed of operation between the two structures.

Figure 3:
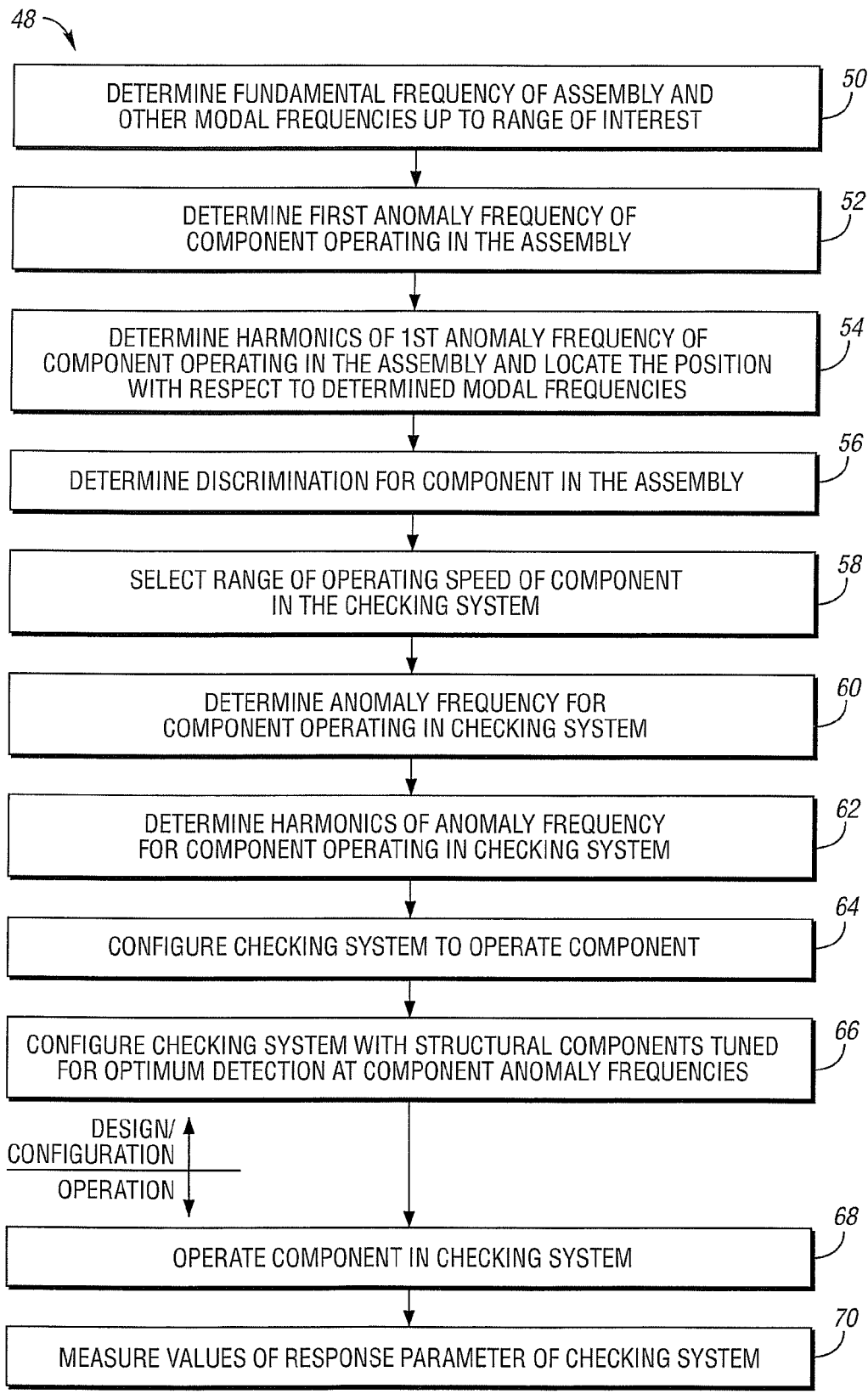
FIG. 3 is a flow chart illustrating a method in accordance with the present invention.

FIG. 3 shows a flowchart 48 illustrating a method of the present invention. At the outset it is noted that although the steps in the flowchart 48 are illustrated sequentially, two or more of the steps may be performed simultaneously, or in an order different from the sequence shown in FIG. 3. At step 50, a fundamental frequency and other modal frequencies over a range of interest of an assembly, such as the transmission 46, are determined. The range of interest is a predetermined frequency range for the transmission, that is chosen, at least in part, based on known operating conditions of the transmission. Of course, if a single modal frequency is of interest, other modal frequencies do not need to be determined.

Because the component being tested, such as the gear 12, will not yet be installed in a transmission when it is tested, step 50 may involve determining the modal frequencies of a transmission utilizing gears of the same design and type as the gear 12, and machined and manufactured in the same manner as the gear 12. In this manner the types and extent of gear anomalies encountered in the gear checking system 10 and the transmission would be similar.

The fundamental frequency and other modal frequencies of a transmission, such as the transmission 46, may be determined by any method effective to give the desired results. For example, a vibration sensor, such as an accelerometer, may be placed on a transmission housing in the same location as that of a vibration sensor utilized for an end-of-line tester. Such a sensor may be of the same type as used on the checking system 10; moreover, if convenient, one of the sensors 40, 41 may even be removed from the checking system 10 and used on the transmission.

Figure 4:
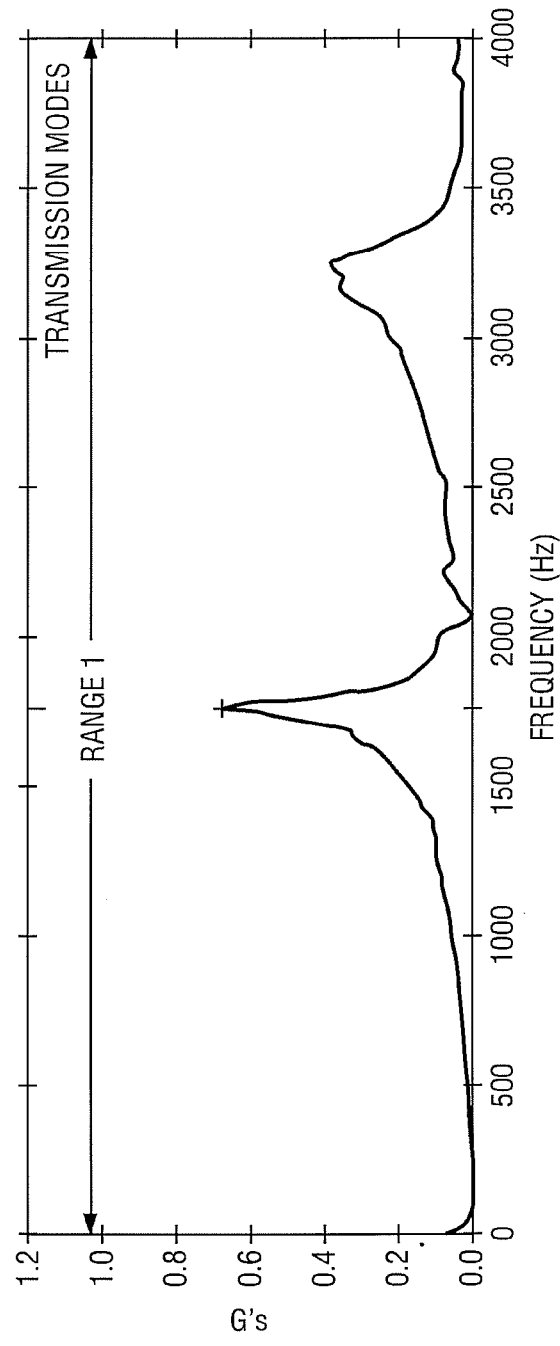
FIG. 4 is a plot of structural modes of a vehicle transmission housing with all the components assembled.

The sensor is connected to a data collection output, such as a computer. The transmission housing is then struck with an instrumented hammer, which itself may have a force sensor embedded within it to measure the force of impact. The vibration response data for the transmission can be transformed utilizing a fast Fourier transform, well known in the art, and plotted in a frequency domain, such as shown in FIG. 4. The graph in FIG. 4 shows some of the structural modes of the tested transmission, including a fundamental frequency which is approximately 1760 Hertz (Hz).

In addition to determining the fundamental frequency and other modal frequencies of an assembly, such as the transmission 46, at least one anomaly frequency of a component operating in the assembly is also determined—see step 52 in FIG. 3. For convenience, this frequency may be referred to as an assembly anomaly frequency, though it is understood that is an anomaly frequency of the component operating in the assembly. When a vehicle transmission is the assembly being analyzed, one anomaly frequency of interest may be a gear mesh frequency, or a "transmission" gear mesh frequency. The modifier "transmission" indicating that it is a gear mesh frequency of a gear as it operates in an assembled transmission. For other assemblies, a different anomaly frequency may be used.

In general, an anomaly frequency is a frequency of operation at which component anomalies are detectable when the component is operating in the assembly. For example, in the case of a vehicle transmission, such as the transmission 46, it is known that gear teeth anomalies in a component gear can cause undesirable noise and vibrations when the gear is operating in the assembled transmission. When other assemblies or subassemblies are being analyzed—e.g., camshafts in an engine—an anomaly frequency may not be a gear mesh frequency, but rather, may be some other frequency at which anomalies in the component being analyzed cause undesirable noise or vibrations in the assembly. Thus, the present invention may be used on virtually any assembly having a moving component and a known frequency or frequencies at which anomalies in the component cause undesirable noise or vibrations.

For the gear 12 in the transmission 46, the determined anomaly frequency is a transmission gear mesh frequency that is a function of the number of teeth on the gear 12 and a speed of rotation of the gear 12 in the transmission 46. If, for example, the gear 12 has 57 teeth, and it rotates at a speed of 875 revolutions per minute (RPM) in the transmission 46, the transmission gear mesh frequency (T-GMF) can be easily calculated from the following formula: T-GMF=(875 RPM)*(57)/(60 sec/min). Thus, for the previous example, the transmission gear mesh frequency is 831.25 Hz.

The transmission gear mesh frequency may then be compared to the fundamental frequency and other modal frequencies of the transmission 46, as shown in FIG. 4. Also shown in FIG. 4 is the predetermined frequency range for the transmission 46 (RANGE 1). The predetermined frequency range for the transmission includes the modal frequencies as plotted in FIG. 4.

Returning to FIG. 3, it is shown that at step 54, harmonic frequencies of the transmission gear mesh frequency—i.e., integer multiples of the transmission gear mesh frequency—are determined and located with respect to the fully assembled transmission modal frequency locations. Of interest, is whether the transmission gear mesh frequency or its harmonics are close to any of the modal frequencies of the transmission, for example, within 20%. As discussed above, the transmission gear mesh frequency is 831.25 Hz; comparing this value to the graph shown in FIG. 4, it is seen that the transmission gear mesh frequency of 831.25 Hz is not within 20% any of the modal frequencies of the transmission in the predetermined frequency range.

Other harmonic frequencies of the transmission gear mesh frequency are then calculated to determine if one or more of them are close to any of the modal frequencies of the transmission in the predetermined frequency range. A simple calculation shows that the second harmonic frequency of the transmission gear mesh frequency is: (831.25 Hz)*2=1662.5 Hz, and thus the first harmonic frequency of the transmission gear mesh frequency is within 20% of the first structural modal frequency for the transmission.

It is worth noting here that other tolerances besides the 20% band can be used to determine when an anomaly frequency is close to a modal frequency of an assembly. For example, based on empirical data, or other methods, a tolerance frequency range may be chosen as a percentage of a modal frequency—e.g., +/−10%, +/−5%, just to illustrate a few examples.

At step 56, shown in FIG. 3, amplitude responses of an assembly are measured using both reject and acceptable components in the assembly. For example, for the transmission 46, amplitude responses are measured once when the transmission 46 includes a gear having at least one known anomaly, and again when the transmission 46 includes a gear having substantially no anomalies—i.e., no anomalies that would cause the gear to have undesirable NVH characteristics. The amplitude responses are measured with the same sensor used to determine the modal frequencies of the transmission 46. A discrimination for the gear 12 in the transmission is then determined, by comparing the two amplitude responses. For example, the discrimination may be determined by taking the difference of the two amplitude responses, or it may be a ratio. This discrimination will be used to help tune the checking system 10.

At step 58, a range of target speeds for the operation of the checking system is selected, which, for the checking system 10, is a higher speed than a conventional low speed gear checker system suitable for vibration sensing. A number of factors may be used to determine the desired speed of operation, for example, whether the gear 12 will be lubricated throughout the test. The checking system 10 is configured to rotate the gear 12 under dry conditions, and therefore, it is necessary to rotate the gear 12 at a much slower speed than it will rotate when it is installed in a transmission.

Once the speed of rotation of the gear 12 in the checking system 10 is chosen, and by knowing the number of teeth in the gear 12, a checking system anomaly frequency, or checking system gear mesh frequency, is determined—see step 60. As with the assembly anomaly frequency, it is understood that the checking system anomaly frequency is an anomaly frequency of the component, but in this case, of the component operating in the checking system. Different harmonics of checking system gear mesh frequency may then be determined—see step 62 in FIG. 3.

The checking system anomaly frequency, like the transmission gear mesh frequency, is a function of the number of teeth on the gear 12 and the speed of rotation of the gear 12. If the checking system 10 is configured to rotate the gear 12 at 120 RPM, the checking system gear mesh frequency is readily calculated to be 114 Hz, and the first harmonic frequency of the checking system gear mesh frequency is therefore 228 Hz. Because it was the first harmonic frequency of the transmission gear mesh frequency (1662.5 Hz) that was within 20% of the fundamental frequency of the transmission 46, it is the first harmonic of the checking system gear mesh frequency (228 Hz) that is of importance in the structural tuning of the gear checking system.

At step 64, shown in FIG. 3, the checking system 10 is designed and configured to operate the gear 12 under test conditions. Furthermore, at step 66, the structural components of the gear checking system are configured for optimum response to gear anomalies. For example, at least a portion of the checking system 10 is configured to have at least one modal frequency within a predetermined frequency range of the checking system 10. The predetermined frequency range of the checking system includes the checking system gear mesh frequency and its harmonics—at least the first harmonic, since it was the first harmonic of the transmission gear mesh frequency that was within 20% of a transmission modal frequency. Of course, for other components, different anomaly frequencies and/or different harmonics of an anomaly frequency may be of interest.

The checking system 10 is also tuned by configuring at least a portion of it to have modal characteristics—e.g., modal frequencies and amplitudes—such that discrimination of the checking system 10 is within a predetermined range based on the discrimination for the transmission 46. For example, if discrimination for the transmission 46, using reject and acceptable gears, was 3:1, the predetermined range for the discrimination of the checking system 10 may be 2.5:1 to 3.5:1. Of course, different values for the predetermined range can be chosen, with a tighter range requiring that the checking system be tuned more closely to the assembly.

The discrimination of the checking system 10—the relative amplitude responses of reject and acceptable gears—may be determined using the same sensor or sensors used to determine the modal frequencies of the checking system. Proper tuning of the checking system 10 may require a number of iterations until the desired modal characteristics are achieved. Once the desired modal characteristics of the checking system 10 are achieved, the design/configuration is complete, and the checking system 10 is ready to be used on a component, such as the gear 12.

Figure 5:
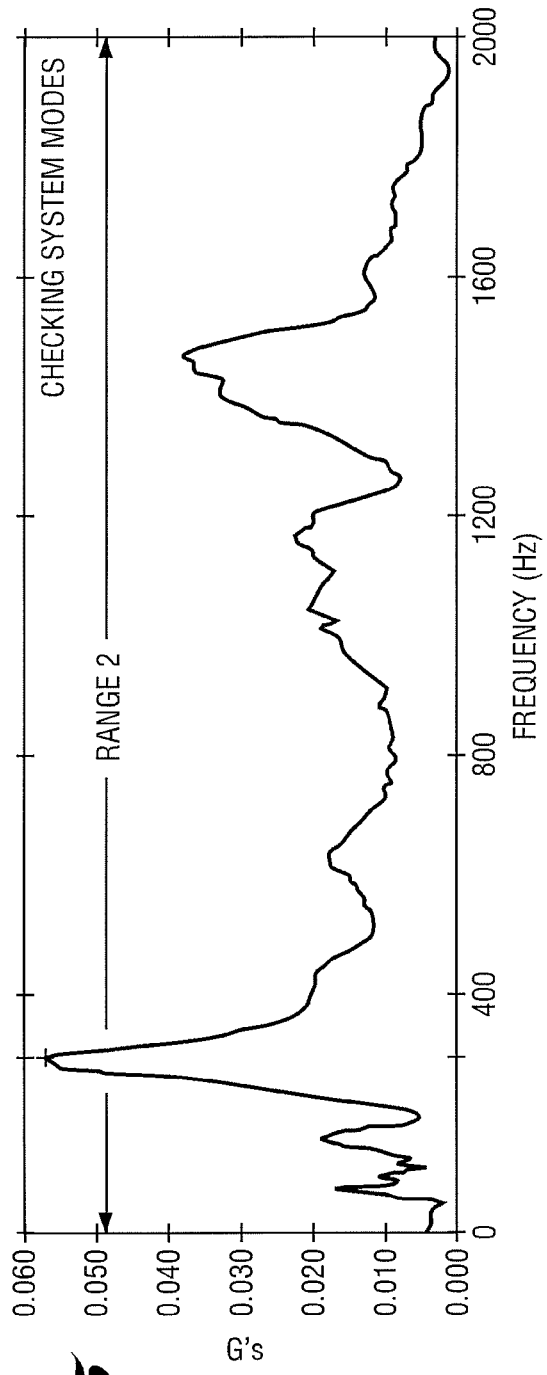
FIG. 5 is a plot of structural modes of a component checking system, such as the component checking system shown in FIG. 1.

Similar to the structural mode plot of the transmission 46, shown in FIG. 4, the structural modes of the checking system 10 can be determined using an impact hammer and sensors as described above. FIG. 5 shows the structural modes of a checking system such as the checking system 10. The modal frequencies are plotted over a model frequency range of the checking system (RANGE 2). In the design stage, a structural analysis technique such as a Finite Element Method, well known in the art, can be utilized for estimation of the checking system modal frequencies.

In order to adjust the fundamental frequency of the checking system 10, or structurally tune the checking system 10, the structure of the various components of the checking system 10 can be modified, or individually tuned. For example, the spindle 22 can be made longer or shorter, as desired. In order to increase the mass of the checking system 10, and inertia disk can be placed on top of the master gear 24. Similarly, other components of the gear checking system 10, such as the spindle 26, can be made bigger or smaller, as desired. Although the checking system 10 contains many different components, the fundamental frequency and other modal frequencies of the checking system 10 may be affected by only a portion of the gear checking system 10—e.g., those components that are above the base 31, and in particular the spindle housings and the rotating components for the two spindles 22,26 for the gear under test and the master gear.

Figure 6A:
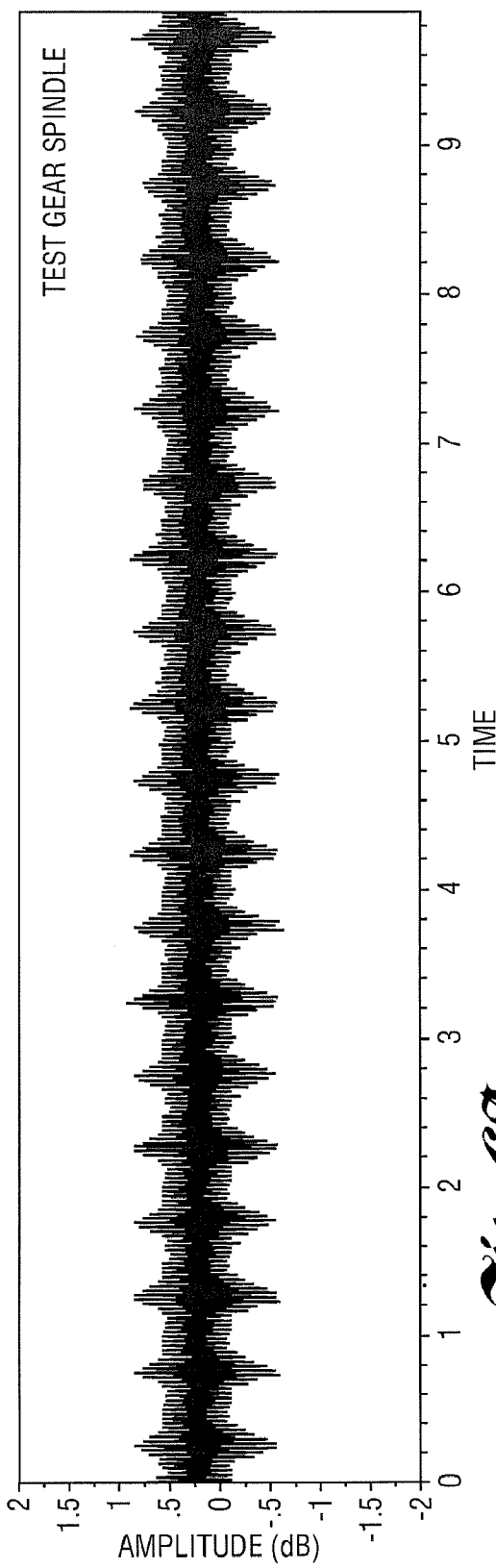
FIGS. 6A and 6B are plots of vibration acceleration values, measured over time, from a structurally tuned component checking system, such as the component checking system shown in FIG. 1.

At step 68, shown in FIG. 3, the gear 12 is then rotated by the motor 14, and vibrations of the gear checking system 10 are measured by the sensors 40, 41—see step 70. FIG. 6A shows a plot of data measured by a sensor, such as the sensor 40 on the gear checking system 10. On the ordinate, are the amplitudes of the measured accelerations, given in terms of gravity (G's). As shown in FIG. 6A, the acceleration values are measured over time. The data shown in FIG. 6A was gathered from operation of a gear, such as the gear 12, that had known gear profile anomalies. For comparison purposes, FIG. 6B shows a similar output for vibration acceleration measured on a master gear spindle, such as the spindle 26.

Figure 6B:
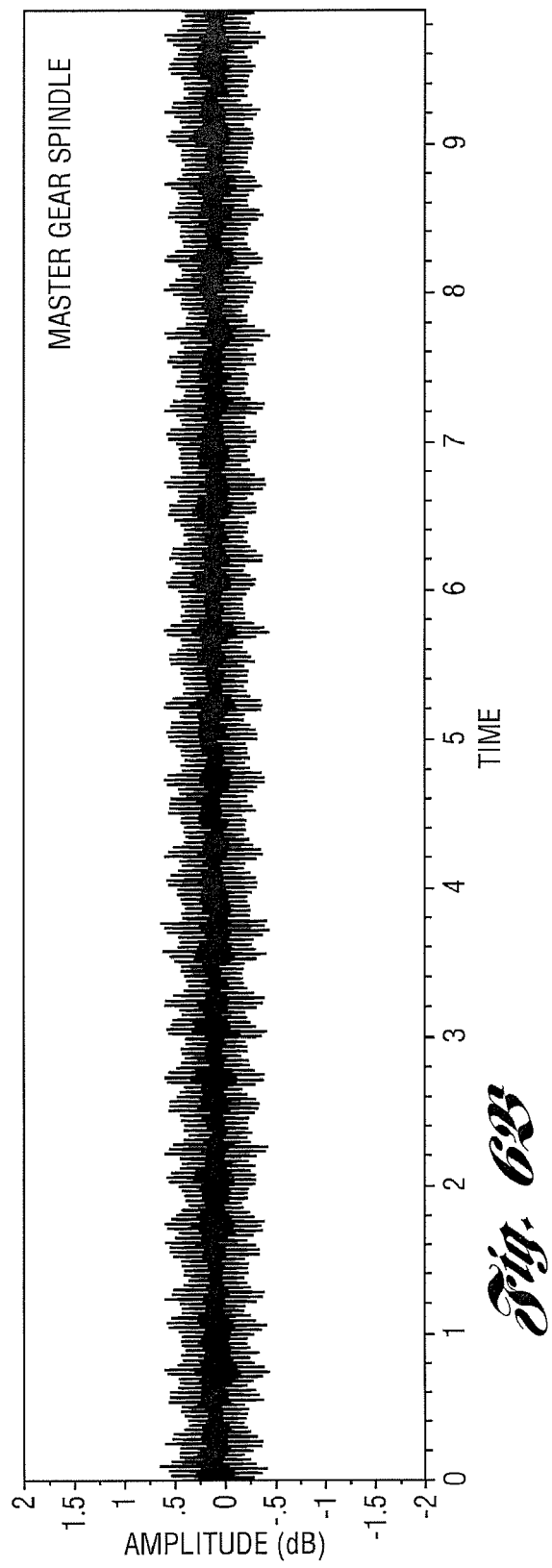
Figure 7A:
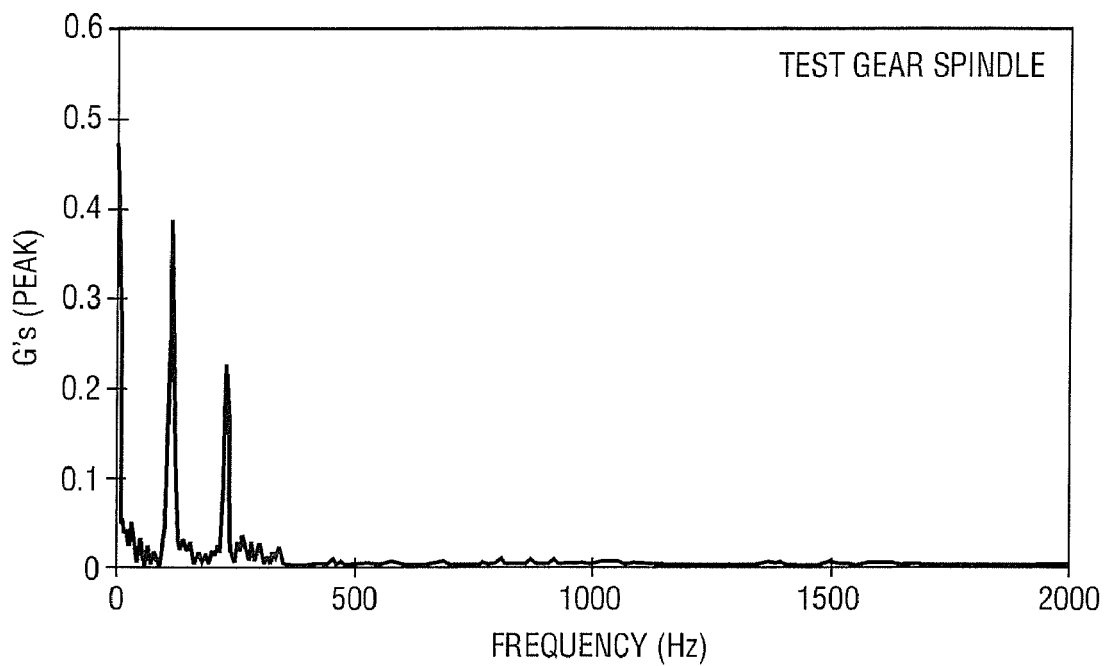
FIGS. 7A and 7B show the plots of FIGS. 6A and 6B transformed into a frequency domain.
Figure 7B:
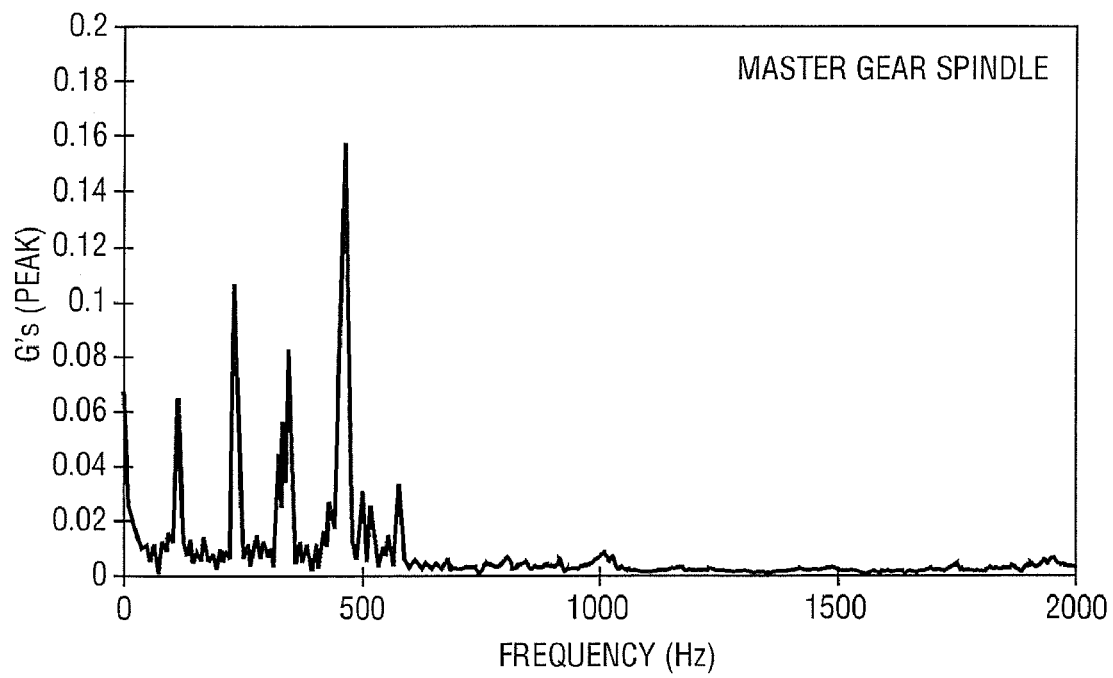

In order to increase the time domain discrimination when operating gears with and without anomalies, the time domain plots shown in FIGS. 6A and 6B can be transformed into frequency domain plots, such as shown in FIGS. 7A and 7B. Such a transformation can be achieved through the use of a fast Fourier Transform (FFT), or some other mathematical algorithms known in the art. In the frequency domain the gear anomaly frequencies—i.e., the gear mesh frequency and harmonics of it, can be identified, and the levels noted when the gear checking system is operated on a gear without anomalies and one with defects. As previously stated, the structure of the checking system is tuned to provide good discrimination or amplification when operating on a gear with and without anomalies at gear anomaly frequencies. Thus, transforming the directly measured time domain output into a frequency domain identifies the excitation due to gear anomaly frequencies and provides greater discrimination between an acceptable and reject gear at these frequencies, which further facilitates detection of anomalies in the gear.

In practice, the digitally recorded vibration output from the checking system 10, after operating on a gear under test, may be compared to a single predetermined amplitude value or values that are provided in the form of a template. Such a template can be placed over an output plot, such as those shown in FIGS. 6 and 7. In addition, to provide further discrimination between a good component and a bad component, various parameters of the gear checking system 10 may be modified. For example, in the case of the mating gears 12 and 24 in the checking system 10, the guide 28 can be adjusted to change the backlash between the mating gears 12, 24. Depending on the particular setup of the checking system 10, certain backlash values may provide greater discrimination between those gears that have anomalies, and those that do not. This type of data can be gathered empirically using gears that have known characteristics.

In general, the method described in FIG. 3 can be used to perform functionality based checking of different types of rotating and sliding components before being used in their assembly. For another example, a camshaft is an important component in an engine, and chatter marks on the camshaft are a major NVH concern for customer satisfaction. The camshaft chatter is audible as an unpleasant noise in an engine due to asperities (undulations) on the surface of the camshaft. Although the camshafts are ground and polished, and checked in several dimensional gauges, the problem of camshaft chatter noise persists in engines. Though surface finish measurement systems implemented in plants measure chatter according to manufacturing specification, the measured chatter marks on a camshaft may not get excited in an engine due to its structural characteristics. Accordingly, it is consistently hard to distinguish between an acceptable and a reject camshaft in terms of the NVH levels it would produce when assembled and run in an engine. A method of the invention, analogous to that describe above in regard to transmissions and gears, can be used to check a camshaft for chatter marks which may cause undesirable NVH levels in an assembled engine.

While the best mode for carrying out the invention has been described in detail, those familiar with the art to which this invention relates will recognize various alternative designs and embodiments for practicing the invention as defined by the following claims.

The invention claimed is:

1. A method for detecting anomalies in a component of an assembly prior to the component being installed in the assembly, the component being movable at one or more speeds in the assembly, the method comprising:
configuring a component checking system, including at least one checking system sensor, capable of operating the component at one or more predetermined speeds;
determining a speed of operation for the component in the checking system, chosen from the one or more predetermined speeds;
determining at least one anomaly frequency of the component in the checking system, the at least one anomaly frequency of the component in the checking system being a function of the speed of operation of the component in the checking system;
configuring at least a portion of the checking system using the at least one anomaly frequency of the component in the checking system to have at least one modal frequency within a predetermined frequency range of the checking system, the predetermined frequency range of the checking system including the at least one anomaly frequency of the component in the checking system;
configuring at least a portion of the checking system to have modal characteristics such that discrimination for the component in the checking system is within a predetermined range based on discrimination for the component in the assembly, the discrimination for the component in the checking system being determined by comparing an amplitude response of the checking system using a component having at least one anomaly and an amplitude response of the checking system using a component having substantially no anomalies, the modal characteristics and the amplitude responses of the checking system being determined using the at least one checking system sensor;
operating the component in the checking system; and
measuring values of a response parameter of the checking system while the component is being operated in the checking system, thereby facilitating detection of anomalies in the component.

2. The method of claim 1, further comprising:
determining at least one modal frequency of the assembly using at least one assembly sensor;
determining at least one anomaly frequency of the component in the assembly, the at least one anomaly frequency of the component in the assembly being a function of a speed of the component at which at least one anomaly is detectable when the component is operating in the assembly;
determining whether the at least one anomaly frequency of the component in the assembly is within a predetermined frequency range of the assembly, the predetermined frequency range of the assembly including the at least one modal frequency of the assembly; and
determining a location of the at least one anomaly frequency with respect to the at least one modal frequency of the assembly.

3. The method of claim 2, further comprising:
using the at least one assembly sensor to determine a first amplitude response of the assembly, with the assembly including a component having at least one anomaly; and
using the at least one assembly sensor to determine a second amplitude response of the assembly, with the assembly including a component having substantially no anomalies, and
wherein, determining the discrimination for the component in the assembly includes comparing the first and second amplitude responses of the assembly.

4. The method of claim 1, further comprising comparing at least one of the measured values of the response parameter to a predetermined value, thereby further facilitating detection of anomalies in the component.

5. The method of claim 1, wherein the response parameter of the checking system is vibration, and the vibration values are measured using the at least one checking system sensor.

6. The method of claim 5, wherein measuring the vibration values includes at least one of measuring acceleration, velocity, displacement, and acoustic characteristics, the measurements occurring over a bandwidth that includes the predetermined frequency range of the checking system.

7. The method of claim 5, further comprising: transforming at least some of the measured values from a time domain to a frequency domain; and
comparing at least one of the transformed values to a predetermined value, thereby further facilitating detection of anomalies in the component.

8. The method of claim 1, further comprising engaging the component in the checking system with a mating component, the engagement in the checking system corresponding to an engagement of the component and a mating component in the assembly.

9. A method for detecting anomalies in a selected gear for a vehicle transmission prior to the selected gear being installed in the transmission, the method comprising:
determining at least one modal frequency of the transmission using at least one sensor on a housing of the transmission
determining a transmission gear mesh frequency as a function of the number of teeth on the selected gear and a speed of rotation of the selected gear in the transmission;
determining whether the transmission gear mesh frequency is within a predetermined transmission frequency range, the predetermined transmission frequency range including the at least one modal frequency of the transmission
determining a location of the transmission gear mesh frequency with respect to the at least one modal frequency of the transmission;
determining whether at least one harmonic frequency of the transmission gear mesh frequency is within the predetermined transmission frequency range;
determining a location of the at least one harmonic frequency of the transmission gear mesh frequency with respect to the at least one modal frequency of the transmission;
using the at least one sensor on the transmission housing to determine a first amplitude response of the transmission, the transmission including a gear having at least one anomaly;
using the at least one sensor on the transmission housing to determine a second amplitude response of the transmission, the transmission including a gear having substantially no anomalies;
determining a discrimination for the selected gear in the transmission by comparing the first and second amplitude responses;

configuring a gear checking system, including at least one checking system sensor, capable of rotating the selected gear at one or more predetermined speeds;

determining a speed of rotation for the selected gear in the checking system, chosen from the one or more predetermined speeds;

determining a checking system gear mesh frequency as a function of the number of teeth on the selected gear and the speed of rotation of the selected gear in the checking system;

determining at least one harmonic frequency of the checking system gear mesh frequency;

configuring at least a portion of the checking system to have at least one modal frequency within a predetermined frequency range of the checking system, the predetermined frequency range of the checking system including the checking system gear mesh frequency and the at least one harmonic frequency of the checking system gear mesh frequency;

further configuring at least a portion of the checking system to have modal characteristics such that discrimination for the selected gear in the checking system is within a predetermined range based on the discrimination for the component in the transmission, the discrimination for the selected gear in the checking system being determined by comparing an amplitude response of the checking system using a gear having at least one anomaly and an amplitude response of the checking system using a gear having substantially no anomalies, the modal characteristics and the amplitude responses of the checking system being determined using the at least one checking system sensor;

rotating the selected gear in the checking system; and measuring values of a response parameter of the checking system while the selected gear is being rotated in the checking system, thereby facilitating detection of anomalies in the gear.

10. The method of claim 9, further comprising applying a torque load to the selected gear while the selected gear is rotated in the gear checking system.

11. The method of claim 10, further comprising configuring the checking system with a mating gear for mating with the selected gear, and wherein the torque load is applied to the selected gear through the mating gear.

12. The method of claim 11, wherein the selected gear and the mating gear engage each other with single flank contact.

13. The method of claim 11, wherein the selected gear drives the mating gear, and the selected gear is rotated at a speed that is less than the speed used to determine the transmission gear mesh frequency.

14. The method of claim 9, wherein the response parameter is vibration, and the measured values are acceleration values of at least a portion of the checking system measured over time by the at least one checking system sensor.

15. The method of claim 14, further comprising:
transforming at least some of the measured values from a time domain to a frequency domain; and
comparing at least one of the transformed values to a predetermined value, thereby further facilitating detection of anomalies in the selected gear.

16. A method for detecting anomalies in a component of an assembly prior to the component being installed in the assembly, the component being movable at one or more speeds in the assembly, the method comprising:
configuring a component checking system, including at least one checking system sensor, capable of operating the component at one or more predetermined speeds;

determining a speed of operation for the component in the checking system, chosen from the one or more predetermined speeds;

determining at least one anomaly frequency of the component in the checking system, the at least one anomaly frequency of the component in the checking system being a function of the speed of operation of the component in the checking system;

configuring at least a portion of the checking system to have at least one modal frequency within a predetermined frequency range of the checking system, the predetermined frequency range of the checking system including the at least one anomaly frequency of the component in the checking system;

configuring at least a portion of the checking system to have modal characteristics such that discrimination for the component in the checking system is within a predetermined range based on discrimination for the component in the assembly, the discrimination for the component in the checking system being determined by comparing an amplitude response of the checking system using a component having at least one anomaly and an amplitude response of the checking system using a component having substantially no anomalies, the modal characteristics and the amplitude responses of the checking system being determined using the at least one checking system sensor;

operating the component in the checking system;

measuring values of a response parameter of the checking system while the component is being operated in the checking system, thereby facilitating detection of anomalies in the component;

determining at least one modal frequency of the assembly using at least one assembly sensor;

determining at least one anomaly frequency of the component in the assembly, the at least one anomaly frequency of the component in the assembly being a function of a speed of the component at which at least one anomaly is detectable when the component is operating in the assembly;

determining whether the at least one anomaly frequency of the component in the assembly is within a predetermined frequency range of the assembly, the predetermined frequency range of the assembly including the at least one modal frequency of the assembly; and determining a location of the at least one anomaly frequency with respect to the at least one modal frequency of the assembly.

17. The method of claim 16, further comprising:

using the at least one assembly sensor to determine a first amplitude response of the assembly, with the assembly including a component having at least one anomaly; and using the at least one assembly sensor to determine a second amplitude response of the assembly, with the assembly including a component having substantially no anomalies, and wherein, determining the discrimination for the component in the assembly includes comparing the first and second amplitude responses of the assembly.

* * * * *